US012656796B2

(12) United States Patent
Samir et al.

(10) Patent No.: US 12,656,796 B2
(45) Date of Patent: Jun. 16, 2026

(54) CIRCUIT FOR GENERATING A REFERENCE VOLTAGE

(71) Applicant: Commissariat à l'Energie Atomique et aux Energies Alternatives, Paris (FR)

(72) Inventors: Anass Samir, Grenoble (FR); Sébastien Ricavy, Grenoble (FR); Bastien Giraud, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 233 days.

(21) Appl. No.: 18/657,462

(22) Filed: May 7, 2024

(65) Prior Publication Data

US 2024/0385636 A1 Nov. 21, 2024

(30) Foreign Application Priority Data

May 15, 2023 (FR) ....................................... 2304777

(51) Int. Cl.
*G05F 1/46* (2006.01)
*G05F 3/26* (2006.01)

(52) U.S. Cl.
CPC .............. *G05F 1/468* (2013.01); *G05F 3/262* (2013.01)

(58) Field of Classification Search
CPC ................................. G05F 1/468; G05F 3/262
USPC ............................................................ 323/313
See application file for complete search history.

(56) References Cited

U.S. PATENT DOCUMENTS

2012/0098508 A1* 4/2012 Zhu ........................... G05F 1/56 323/272
2022/0171420 A1* 6/2022 Park ........................ G05F 3/267

FOREIGN PATENT DOCUMENTS

CN 102455728 A 5/2012

OTHER PUBLICATIONS

Preliminary Search Report for French application No. 2304777, mailed on Nov. 10, 2023, 2 pages.
De Vita, Giuseppe, and Giuseppe Iannaccone. "A sub-1 V, 10 ppm/° C., nanopower voltage reference generator." In 2006 Proceedings of the 32nd European Solid-State Circuits Conference, pp. 1536-1542. IEEE, 2007.

(Continued)

*Primary Examiner* — Yemane Mehari
(74) *Attorney, Agent, or Firm* — Jordan IP Law LLC

(57) ABSTRACT

The present disclosure relates to a device (REFGEN) comprising: a first divider bridge (200) between a first node (202) at a supply voltage (VDDE) and a second node (204) at a reference potential (GND); a first transistor (Ten) and a second divider bridge (208) in series between the first and second nodes, the first transistor having its gate at the first bridge; a buffer circuit (BUFFa1) having an input (220) connected to a node (214) of the second bridge, and an output (218) delivering a reference voltage (VrefL); and a second transistor (To1) having its drain connected to the output of the buffer circuit, and its source connected to one of the first and second nodes. The first transistor (Ten) is OFF if the supply voltage (VDDE) is less than a threshold. The second transistor is ON if the first transistor is OFF, and vice versa.

14 Claims, 5 Drawing Sheets

(56) References Cited

OTHER PUBLICATIONS

Samir, A., L. Girardeau, Y. Bert, Edith Kussener, W. Rahajandraibe, and Herve Barthelemy. "173nA-7.5 ppm/° C.-771mV-0.03 mm 2 CMOS resistorless voltage reference." In 2011 Faible Tension Faible Consommation (FTFC), pp. 71-74. IEEE, 2011.
Ueno, Ken, Tetsuya Hirose, Tetsuya Asai, and Yoshihito Amemiya. "A 300 nW, 15 ppm/° C., 20 ppm/V CMOS voltage reference circuit consisting of subthreshold Mosfets." IEEE Journal of solid-state circuits 44, No. 7 (2009): 2047-2054.
Anvesha, A., and Maryam Shojaei Baghini. "A sub-1V 32nA process, voltage and temperature invariant voltage reference circuit." In 2013 26th International Conference on VLSI Design and 2013 12th International Conference on Embedded Systems, pp. 136-141. IEEE, 2013.
Qin, Song, Hongxing Li, and Chris Mangelsdorf. "A 280NA, 87PPM/° C., high PSRR full CMOS voltage reference and its application." In 2012 International Semiconductor Conference Dresden-Grenoble (ISCDG), pp. 155-158. IEEE, 2012.
Osaki, Yuji, Tetsuya Hirose, Nobutaka Kuroki, and Masahiro Numa. "1.2-V supply, 100-nW, 1.09-V bandgap and 0.7-V supply, 52.5-nW, 0.55-V subbandgap reference circuits for nanowatt CMOS LSIs." IEEE Journal of Solid-State Circuits 48, No. 6 (2013): 1530-1538.

* cited by examiner

CIRCUIT FOR GENERATING A REFERENCE VOLTAGE

FIELD

The present disclosure relates generally to integrated electronic circuits, and more particularly to a device for generating a reference voltage.

BACKGROUND

Integrated circuits are known in which a first supply voltage, for example available on a connection pad of a chip comprising these integrated circuits, and a second supply voltage, for example generated internally on the chip, having a nominal value less than that of the first voltage, are provided.

Some of these known electronic circuits include at least one device, such as a resistive memory, which is supplied with the first supply voltage in order to be functional. Further, this device is implemented with MOS (Metal Oxide Semiconductor) transistors having a voltage withstand limit value less than the nominal value of the first voltage. To enable the device to be implemented with such transistors, cascode architectures (or stacked architectures) are used.

In cascode architecture, two transistors are connected in series with each other, and one of the two transistors receives a bias or reference voltage at its gate.

To generate the reference voltage for the cascode architectures of such a device, it has been proposed to use the second voltage as reference voltage when the subtraction of the nominal value of the second voltage from that of the first voltage is less than the voltage withstand of the transistors.

However, in this case, the second voltage must be applied to the cascode structures before the first voltage, to avoid destroying the transistors. Further, when the variations in the first and second voltages are not correlated, this degrades the performance of the cascode structures, and therefore the performance of the device.

To generate the reference voltage for the cascode architectures of such a device, it has also been proposed to use conventional circuits to generate, from a supply voltage, a DC voltage that is independent of variations in supply voltage and temperature, and to use the generated voltage as reference voltage.

However, these conventional circuits for generating a DC voltage are particularly prone to variations in the manufacturing process.

Furthermore, to achieve good temperature stability, the voltage generated can only take on a single value, which is determined by the circuit used to generate it. The voltage generated may therefore be too low to be used as reference voltage for cascode structures. This is the case, for example, when the difference between the generated voltage and the first supply voltage is higher than the voltage withstand of the transistors of the cascode structures. Conversely, the generated voltage may be too high to be used as reference voltage for cascode structures. This is the case, for example, when the cascode structures have to operate with the first voltage at its nominal value, but also when the first voltage is at a lower value corresponding, for example, to a low-power operating mode.

More generally, known solutions for generating a reference voltage to bias cascode structures have various drawbacks.

SUMMARY

There is a need to overcome some or all of the drawbacks of known solutions for generating a reference voltage, e.g. a reference or bias voltage for a cascode structure.

One embodiment provides a circuit that overcomes some or all of the drawbacks of known solutions for generating a reference voltage.

One embodiment provides a device for generating a reference voltage comprising:

a first voltage divider bridge connected between a first supply node configured to receive a first supply voltage, and a second supply node configured to receive a reference potential; a first MOS transistor and a second resistive voltage divider bridge connected in series between the first and second supply nodes, the first transistor having its gate connected to an intermediate node of the first bridge, and its source connected to one of the first and second supply nodes; a first buffer circuit configured to be supplied with the first voltage, and comprising an input connected to a first intermediate node of the second bridge, and an output configured to deliver a first reference voltage; and a second MOS transistor having its drain connected to the output of the first buffer circuit, and its source connected to one of the first and second supply nodes, wherein the first bridge is configured so that the first transistor is OFF when the first voltage is at a value less than a first threshold itself less than a voltage withstand limit of the transistors, and wherein the second transistor is configured to be in the ON state if the first transistor is in the OFF state, and vice versa.

According to one embodiment:

the first transistor is N-channel, and has its source connected to the second supply node; the device further comprises a third MOS transistor in series with a first resistive element between the first and second supply nodes, the third transistor being P-channel, and having its source connected to the first supply node, and its gate connected to a second intermediate node of the second bridge; and the second transistor is P-channel, and has its gate connected to the drain of the third transistor.

According to one embodiment, the device further comprises:

a second buffer circuit configured to be supplied with a second supply voltage having a nominal value lower than that of the first supply voltage; and an N-channel MOS transistor having its source connected to the second supply node, its drain connected to the intermediate node of the first bridge, and its gate connected to the output of the second buffer circuit, wherein the second buffer circuit is intended to receive a binary signal at a low level corresponding to a zero voltage if a current value of the first voltage is higher than the voltage withstand limit of the transistors, and at a low or high level determined by a control otherwise, the high level of said signal corresponding to the second supply voltage.

According to one embodiment:

the first transistor is P-channel, and has its source connected to the first supply node;

the device further comprises a third MOS transistor in series with a first resistive element between the first and second supply nodes, the third transistor being N-channel, and having its source connected to the second supply node, and its gate connected to a second intermediate node of the second bridge; and the second transistor is N-channel, and has its gate connected to the drain of the third transistor.

According to one embodiment, the device further comprises:

a second buffer circuit configured to be supplied with a second supply voltage having a nominal value lower than that of the first supply voltage;

a third voltage divider bridge and an N-channel MOS transistor connected in series between the first and second supply nodes, the transistor having its source connected to the second supply node, its drain connected to the third bridge, and its gate connected to the output of the second buffer circuit; and a P-channel MOS transistor having its source connected to the first supply node, its gate connected to the intermediate node of the third bridge, and its drain connected to the intermediate node of the first bridge, wherein the second buffer circuit is intended to receive a binary signal at a low level corresponding to a zero voltage if a current value of the first voltage is higher than the voltage withstand limit of the transistors, and at a low or high level determined by a control otherwise, the high level of said signal corresponding to the second supply voltage.

According to one embodiment, the device further comprises:

a third MOS transistor and a third resistive voltage divider bridge connected in series between the first and second supply nodes, the sources of the first and third transistors being connected to respective different ones of the first and second supply nodes;

a second buffer circuit configured to be supplied with the first voltage, and comprising an input connected to a first intermediate node of the third bridge, and an output configured to deliver a second reference voltage; and a fourth MOS transistor having its drain connected to the output of the second buffer circuit, the sources of the second and fourth transistors being connected to respective different ones of the first and second supply nodes;

wherein the third transistor is configured to be OFF, respectively ON, when the first transistor is OFF, respectively ON, and wherein the fourth transistor is configured to be ON if the third transistor is OFF, and vice versa.

According to one embodiment:

the first transistor is N-channel, and has its source connected to the second supply node; the third transistor is P-channel, and has its gate connected to a second intermediate node of the second bridge;

the second transistor is P-channel, and has its gate coupled, preferably connected, to the drain of the third transistor, and its source connected to the first supply node; and the fourth transistor is N-channel, and has its gate coupled, preferably connected, to the drain of the first transistor.

According to one embodiment, the device further comprises:

a third buffer circuit configured to be supplied with a second supply voltage having a nominal value lower than that of the first supply voltage; and an N-channel MOS transistor having its source connected to the second supply node, its drain connected to the intermediate node of the first bridge, and its gate connected to the output of the third buffer circuit, wherein the third buffer circuit is intended to receive a binary signal at a low level corresponding to zero voltage if a current value of the first voltage is higher than the voltage withstand limit of the transistors, and at a low or high level determined by a control otherwise, the high level of said signal corresponding to the second supply voltage.

According to one embodiment:

the first transistor is P-channel, and has its source connected to the first supply node;

the third transistor is N-channel, and has its gate connected to a second intermediate node of the second bridge;

the second transistor is N-channel, and has its gate coupled, preferably connected, to the drain of the third transistor, and its source connected to the second supply node; and the fourth transistor is P-channel, and has its gate coupled, preferably connected, to the drain of the first transistor.

According to one embodiment, the device further comprises:

a third buffer circuit configured to be supplied with a second supply voltage having a nominal value lower than that of the first supply voltage;

a fourth voltage divider bridge and an N-channel MOS transistor connected in series between the first and second supply nodes, the transistor having its source connected to the second supply node, its drain connected to the fourth bridge, and its gate connected to the output of the third buffer circuit; and a P-channel MOS transistor having its source connected to the first supply node, its gate connected to the intermediate node of the fourth bridge, and its drain connected to the intermediate node of the first bridge, wherein the third buffer circuit is configured to receive a binary signal at a low level corresponding to zero voltage if a current value of the first voltage is higher than the voltage withstand limit of the transistors, and at a low or high level determined by a control otherwise, the high level of said signal corresponding to the second supply voltage.

One embodiment provides a system comprising a device as described above, and a circuit configured to receive said command, first voltage and second voltage, and to deliver said binary signal.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
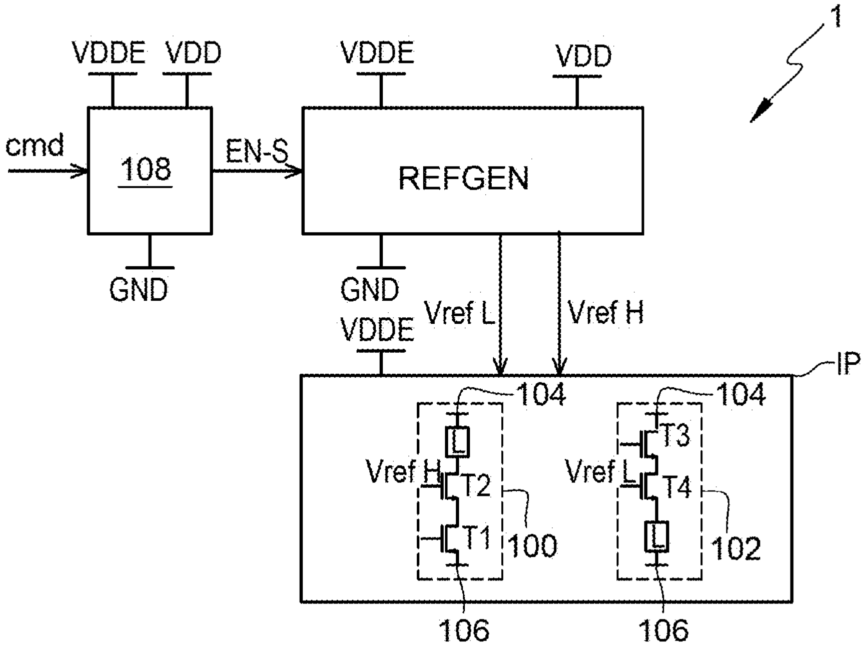
FIG. 1 illustrates, schematically and in block form, an example electronic system comprising a circuit for generating a reference voltage according to one embodiment.

FIG. 1 illustrates, schematically and in block form, an example electronic system 1 comprising a device REFGEN for generating a reference voltage according to one embodiment.

More particularly, system 1, corresponding for example to a portion of an integrated circuit chip, comprises a device IP, for example a resistive memory, and the device REFGEN.

The device IP is supplied with a supply voltage VDDE, for example available on a connection pad of the chip. By way of example, the voltage VDDE has a nominal value of approximately 3.3 V. The device IP comprises a terminal configured to receive the voltage VDDE, and another terminal configured to receive a reference potential GND, for example ground, to which the voltage VDDE is referenced.

The device IP comprises MOS transistor cascode structures. For example, the device IP comprises cascode structures 100 having N-channel MOS transistors and cascode structures 102 having P-channel MOS transistors.

By way of example, each structure 100 comprises two N-channel MOS transistors T1 and T2 connected in series between a node 104 receiving the voltage VDDE, and a node 106 receiving the potential GND. Transistor T1 has its source connected to node 106, and its drain connected to the source of transistor T2, the source of transistor T2 being coupled to node 104 through a load L. The gate of transistor T2 is configured to receive a reference or bias voltage VrefH. Transistor T2 is, for example, called a cascode transistor. The gate of transistor T1 is configured to receive a control voltage between 0 V, and the bias voltage VrefH.

Symmetrically, by way of example, each structure 102 comprises two P-channel MOS transistors T3 and T4 connected in series between nodes 104 and 106. Transistor T2 has its source connected to node 104, and its drain connected to the source of transistor T2, the source of transistor T2 being coupled to node 106 through a load L. The gate of transistor T4 is configured to receive a reference or bias voltage VrefL. Transistor T4 is referred to as a cascode transistor, for example. The gate of transistor T3 is configured to receive a control voltage between the reference voltage VrefL and the supply voltage VDDE.

In the following description, we refer to Vmax as the maximum voltage that can be applied between the gate and source or source and drain of each of the transistors in the device IP without damaging the transistor. In other words, Vmax is the voltage withstand limit of the MOS transistors of the device IP.

Preferably, voltages VrefL and VrefH have different values. For example, to optimize operation of the N-channel and P-channel transistors of the device IP, voltage VrefL is selected equal to voltage VDEE minus voltage VrefH. However, in other examples, voltages VrefL and VrefH have the same value.

Voltages VrefH and VrefL are received by the device IP.

The device REFGEN is configured to deliver voltages VrefL and VrefH. The device REFGEN is supplied with voltage VDDE. The device REFGEN has, for example, one terminal receiving the voltage VDDE, and another terminal receiving the reference potential GND.

According to one embodiment, the device REFGEN is further configured to receive a supply voltage VDD and a binary signal EN-S.

The voltage VDD has a nominal value lower than the voltage VDDE. In particular, the voltage VDD is less than the voltage withstand limit Vmax. For example, the result of subtracting the nominal value of the voltage VDD from that of the voltage VDDE is less than the voltage withstand limit of the transistors T1, T2, T3, and T4 of the device IP. By way of example, voltage VDD is a voltage generated by a circuit (not shown) on the integrated circuit chip comprising system 1.

The signal EN-S is a binary signal the low level of which corresponds to zero voltage, and the high level of which corresponds to the voltage VDD. The signal EN-S is configured to default to its low level. The signal EN-S is further configured to be at its low level when the current value of the voltage VDDE is higher than the Vmax voltage. When the current value of voltage VDDE is less than voltage Vmax, the level of signal EN-S is determined by a control signal cmd. For example, levelling the signal EN-S with the signal cmd when the voltage VDDE is less than the voltage Vmax corresponds to a low-power operating mode where the voltage VDDE is at a current value lower than its nominal value, for example a current value equal to the nominal value of the voltage VDD.

By way of example, system 1 comprises a circuit 108 configured to receive the voltages VDDE and VDD, the potential GND and the signal cmd, and to deliver the signal EN-S. Implementing such a circuit 108, and, more generally, generating the signal EN-S, are within the capabilities of those skilled in the art, for example by using common power-on reset (PoR) circuits.

In an alternative embodiment, the circuit REFGEN does not receive the signal EN-S and the voltage VDD.

In the example shown in FIG. 1, the device IP comprises structures 100 and 102, and the device REFGEN therefore delivers both voltages VrefH and VrefL. In other examples, the device IP comprises no structure 100, and the device REFGEN delivers only the VrefL voltage, or, conversely, the device IP comprises no structure 102, and the device REFGEN delivers only the voltage VrefH.

Figure 2:
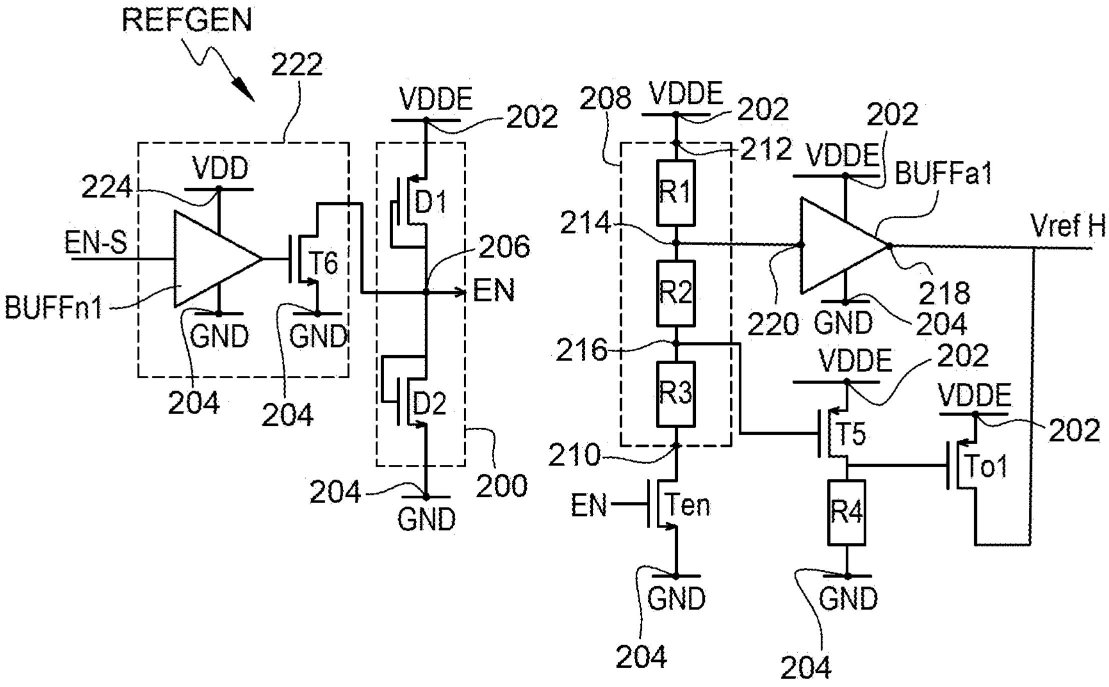
FIG. 2 illustrates, in the form of a circuit, an embodiment of the generating circuit shown in FIG. 1.

FIG. 2 illustrates, in the form of a circuit, an embodiment of the circuit REFGEN shown in FIG. 1. In this embodiment, the device REFGEN is configured to deliver only the voltage VrefH.

The device REFGEN comprises a voltage divider bridge 200. Bridge 200 is connected between a node 202 configured to receive voltage VDDE, and a node 204 configured to receive potential GND. For example, bridge 200 has one end connected to node 202, and one end connected to node 204.

According to one embodiment, bridge 200 comprises one or more P-channel MOS transistors connected in series between node 202 and an intermediate node 206 of bridge 200. Each of these P-channel transistors is diode-connected, or, in other words, has its drain connected to its gate. Each of these P-channel transistors has its source on the side of node 202. In FIG. 2, these P-channel transistors are shown as a single P-channel MOS transistor, D1. Symmetrically, bridge 200 comprises one or more N-channel MOS transistors connected in series between node 206 and node 204. Each of these N-channel transistors is diode-connected, or, in other words, has its drain connected to its gate. Each of these N-channel transistors has its source on the side of node 204. In FIG. 2, these N-channel transistors are shown as a single N-channel MOS transistor, D2.

According to a variant embodiment, the P-channel MOS transistors of bridge 200 are replaced by diodes, for example diodes having their anodes on the side of node 202, and the N-channel MOS transistors of bridge 200 are also replaced by diodes, for example diodes having their anodes on the side of node 206.

According to another variant embodiment, the P-channel transistors of bridge 200 are replaced by a resistive element comprising one or more resistors in series between nodes 202 and 206, and the N-channel transistors of bridge 200 are replaced by another resistive element comprising one or more resistors in series between nodes 206 and 204.

The device REFGEN comprises an MOS transistor Ten and a resistive voltage divider bridge 208, with transistor Ten and bridge 208 connected in series between nodes 202 and 204.

Transistor Ten has its gate connected to node 206, at which a voltage EN is available. The source of transistor Ten is connected to node 204 in the embodiment shown in FIG. 2. In the embodiment shown in FIG. 2, transistor Ten is N-channel.

The dividing bridge 208 has one end 210 connected to the drain of transistor Ten. Dividing bridge 208 has another end 212 connected to node 202 in the embodiment shown in FIG. 2.

The bridge 208 comprises, for example, at least three resistive elements R1, R2, and R3. Each resistive element R1, R2, R3 of bridge 208 may correspond to a single resistor or to a series and/or parallel combination of several resistors. By way of example, element R1 is connected between end 212 and an intermediate node 214 of bridge 208, element R2 is connected between node 214 and another intermediate node 216 of bridge 208, and element R3 is connected between node 216 and end 210 of bridge.

The device REFGEN comprises a buffer circuit BUFFa1. Circuit BUFFa1 is supplied with voltage VDDE. For example, circuit BUFFa1 has one terminal connected to node 202, and one terminal connected to node 204.

The circuit BUFFa1 is an analog buffer circuit. In other words, circuit BUFFa1 is configured to deliver a voltage on its output 218 having a value identical to that of a voltage it receives on its input 220, while ensuring isolation between its input and its output. In other words, circuit BUFFa1 is a unity-gain follower circuit.

Input 218 of circuit BUFFa1 is connected to an intermediate node of bridge 208, for example node 214. Output 220 of circuit BUFFa1 delivers voltage VrefH.

The device REFGEN further includes a MOS transistor To1. The drain of transistor To1 is connected to the output of circuit BUFFa1. The source of transistor To1 is connected to node 202 in the embodiment shown in FIG. 2, where the device REFGEN is configured to deliver voltage VrefH. In the embodiment shown in FIG. 2, transistor To1 is P-channel.

Transistor To1 is configured to be in the ON state when transistor Ten is in the OFF state, and to be in the OFF state when transistor Ten is in the ON state. More particularly, transistor To1 is configured so that its ON or OFF state is determined by a voltage value on an intermediate node of the dividing bridge 208, for example on node 216 of bridge 208.

In the example shown in FIG. 2, the device REFGEN comprises a P-channel MOS transistor T5 and a resistive element R4 in series between nodes 202 and 204. Transistor T5 has its gate connected to node 216 of bridge 208, its source connected to the same node 202 as the source of transistor To1, and its drain coupled to node 204 through element R4. The gate of transistor To1 is connected to the drain of transistor T5.

In the circuit REFGEN, the dividing bridge 200 is configured so that transistor Ten is in the OFF state if the voltage VDDE is less than a threshold VT1, for example substantially equal to 0.9 V. Preferably, threshold VT1 is less than voltage Vmax. Conversely, the dividing bridge 200 is configured so that transistor Ten is ON if the voltage VDDE is higher than the threshold VT1. More particularly, the dividing bridge 200 is configured to operate as above when taken alone, i.e. when no circuit directly modifies the potential of node 206, for example by pulling this node 206 down to GND or up to VDDE.

So, when bridge 200 is taken alone and voltage VDDE is less than threshold VT1, voltage EN is less than the threshold of transistor Ten, which is then in the OFF state. Node 216 is thereby at voltage VDDE, and so transistor T5 is in the OFF state. The OFF state of transistor T5 causes the gate of transistor To1 to receive the potential GND, so that transistor To1 is in the ON state. Output 218, i.e. voltage VrefH, is then pulled to voltage VDDE. In other words, as long as voltage VDDE is less than threshold VT1, voltage VrefH follows voltage VDDE. Conversely, when bridge 200 is taken alone and voltage VDDE is higher than or equal to threshold VT1, voltage EN is sufficient for transistor Ten to turn ON, resulting in transistor T5 turning ON, this ON state of transistor T5 forcing transistor To1 to turn OFF. The voltage VrefH is then equal to the voltage on input 220 of circuit BUFFa1. By way of example, dividing bridge 208 is configured so that, when transistor Ten is ON, the voltage at input 220 of circuit BUFFa1 is equal to 0.55 times the voltage VDDE when output 218 of circuit BUFFa1 delivers voltage VrefH.

According to one embodiment (not shown), the circuit REFGEN does not receive the signal EN-S and the voltage VDD.

According to another embodiment, as illustrated in FIG. 2, the device REFGEN receives the signal EN-S and the voltage VDD. The device REFGEN then comprises a circuit 222 configured to receive the signal EN-S and to pull, only when the signal EN-S is at its high level, the node 206 to that of the potential GND and of the voltage VDDE which turns the transistor Ten in the OFF state when applied to the transistor gate. In the embodiment shown in FIG. 2, where transistor Ten is N-channel, and has its source connected to node 204, circuit 222 is configured to pull node 206 to node 204 when signal EN-S is at its high level.

When the voltage VDDE is less than Vmax and the signal cmd controls the high level of the signal EN-S, providing the circuit 222 enables the voltage VrefH to be equal to the voltage of node 202 to which the source of transistor To1 is connected. By way of example, such an operation allows in a low-supply mode where the voltage VDDE is at a low value compared with its nominal value and less than the voltage Vmax, for example a low value equal to the nominal value of the voltage VDD, the voltage VrefH to be at a value enabling operation of the cascode structures 100 of the device IP (FIG. 1).

In the embodiment shown in FIG. 2, circuit 222 comprises a buffer circuit BUFFn1 and an N-channel MOS transistor T6. Circuit BUFFn1 is supplied with voltage VDD. For example, circuit BUFFn1 has one terminal connected to node 204, and one terminal connected to a node 224 configured to receive voltage VDD.

The circuit BUFFn1 is a digital buffer circuit. The circuit BUFFn1 is therefore configured to deliver at its output 226 a digital signal at high level (VDD) when its input 228 receives the high level of the signal EN-S, and at low level (GND) when its input receives the low level (GND) of the signal EN-S, while ensuring isolation between its input and output. By way of example, the circuit BUFFn1 comprises two inverters in series between its input 228 and output 226.

Transistor T6 has its source connected to node 204, its gate connected to output 226 of circuit BUFFn1, and its drain connected to node 206 of bridge 200.

We have described above in relation to FIG. 2 an embodiment in which the device REFGEN is configured to deliver the voltage VrefH, implying that transistor To1 has its source connected to node 202.

In an alternative embodiment (not illustrated), the device described in relation to FIG. 2 is configured to generate the voltage VrefL. In this case, transistor To1 is N-channel, and has its source connected to node 204. In such a variant, transistor To1 remains controlled from a voltage on an intermediate node of bridge 208, for example on node 216, so as to be ON when transistor Ten is OFF, and to be OFF when transistor Ten is ON. In such a variant, the gate of transistor To1 is, for example, connected to node 216, and transistor T5 and resistive element R4 may be omitted. In such a variant, voltage VrefL is then delivered at the output of circuit BUFFa1 in place of voltage VrefH, voltage VrefL being zero as long as transistor Ten is OFF and equal to the voltage at node 214 when transistor Ten is ON. By way of example, when the output 218 of circuit BUFFa1 delivers voltage VrefL, bridge 208 is configured so that the voltage on node 214 is equal to 0.45 times the voltage VDDE when transistor Ten is ON.

The device REFGEN described in relation to FIG. 2 has the advantage of being able to be implemented with MOS transistors similar to those of the device IP, i.e. MOS transistors with a voltage withstand Vmax.

Figure 3:
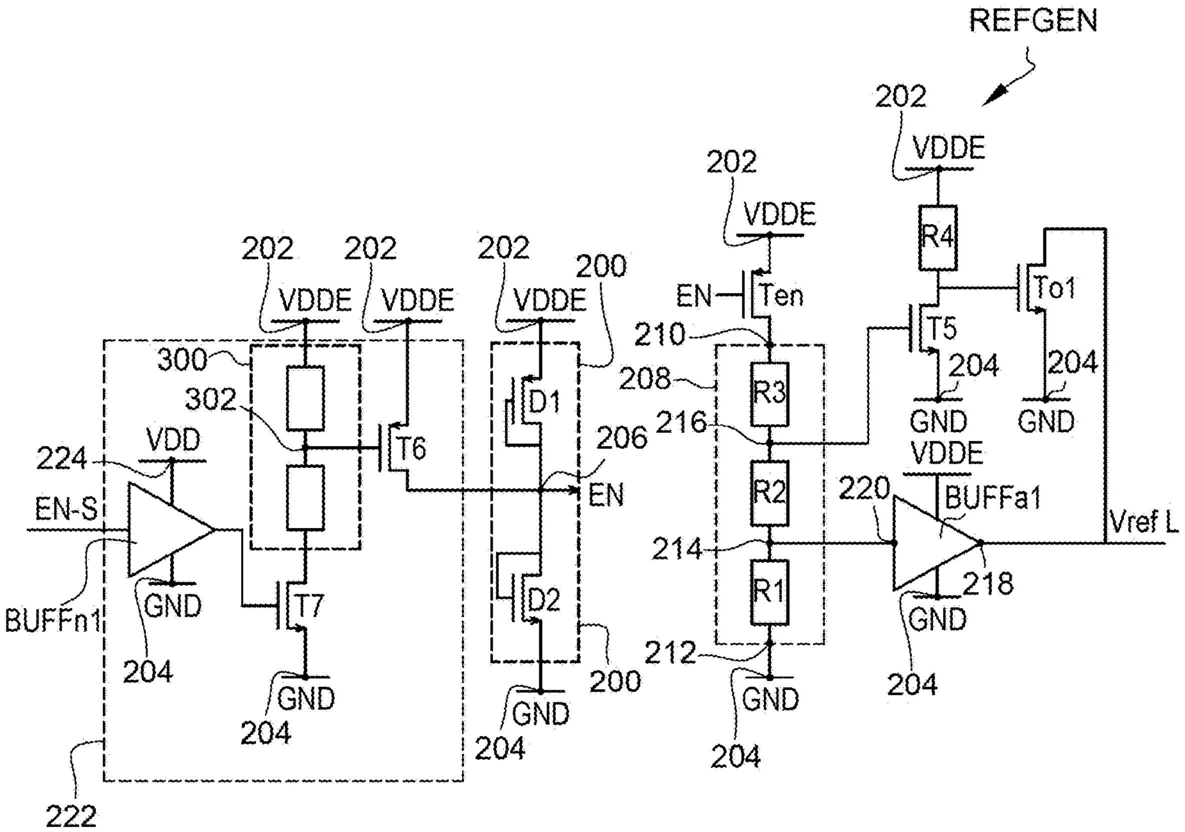
FIG. 3 illustrates, in the form of a circuit, another embodiment of the generating circuit shown in FIG. 1.

FIG. 3 illustrates, in the form of a circuit, another embodiment of the circuit REFGEN shown in FIG. 1. In this embodiment, the device REFGEN is configured to deliver only the voltage VrefL.

The device REFGEN shown in FIG. 3 has many features in common with that shown in FIG. 2, and only the differences between these two devices are highlighted here. In particular, unless indicated otherwise, all that has been stated for the device REFGEN described in relation to FIG. 2 applies to the device REFGEN shown in FIG. 3.

The device REFGEN comprises voltage divider bridge 200, resistive voltage divider bridge 208, buffer circuit BUFFa1, transistor Ten, and transistor To1.

Transistor Ten and bridge 208 are connected in series between nodes 202 and 204. However, unlike what has been described in relation to FIG. 2, in FIG. 3 the transistor Ten is P-channel, and has its source connected to node 202, the end 212 of the dividing bridge 208 therefore being connected to node 204.

Further, in the embodiment shown in FIG. 3, the output 218 of the buffer circuit BUFFa1 delivers the voltage VrefL, and not the voltage VrefH as in FIG. 2. The input 218 of the circuit BUFFa1 is connected to an intermediate node of the bridge 208, for example to node 214.

In the embodiment shown in FIG. 3, where the device REFGEN is configured to deliver the voltage VrefL, the source of transistor To1 is connected to node 204 and transistor To1 is N-channel. As in FIG. 2, in the device REFGEN of FIG. 3, transistor To1 is configured to be ON when transistor Ten is OFF, and to be OFF when transistor Ten is ON. More particularly, transistor To1 is configured so that its ON or OFF state is determined by a voltage value on an intermediate node of the dividing bridge 208, for example on node 216 of bridge 208.

In the example shown in FIG. 3, the device REFGEN comprises the MOS transistor T5 and the resistive element R4 in series between nodes 202 and 204. However, compared with that was described in relation to FIG. 2, in FIG. 3 the transistor T5 is N-channel, and has its source connected to node 204.

As in FIG. 2, in FIG. 3 the dividing bridge 200 is configured so that transistor Ten is in the OFF state if the voltage VDDE is less than a threshold VT1, for example substantially equal to 0.9 V, and so that transistor Ten is ON if the voltage VDDE is higher than the threshold VT1.

More particularly, the dividing bridge 200 is configured to have the above operation when taken alone.

Thus, when bridge 200 is taken alone, and voltage VDDE is less than threshold VT1, the difference between voltages EN and VDDE is not sufficient for transistor Ten to turn ON. The OFF state of transistor Ten implies that node 216 is at potential GND, resulting in transistor T5 being in the OFF state and the gate of transistor To1 receiving the voltage VDDE. Transistor To1 is then in the ON state and the voltage VrefL is zero. Conversely, when bridge 200 is taken alone and voltage VDDE is higher than or equal to threshold VT1, the difference between voltages EN and VDDE is sufficient for transistor Ten to turn ON, resulting in transistor T5 turning ON, setting transistor To1 in the OFF state. The voltage VrefL is then equal to the voltage on input 220 of circuit BUFFa1. By way of example, when the output 218 of the circuit BUFFa1 delivers the voltage VrefL, the bridge 208 is configured so that the voltage on node 214 is equal to 0.45 times the voltage VDDE when transistor Ten is ON.

In one embodiment (not shown), the circuit REFGEN does not receive the signal EN-S, nor the voltage VDD.

In another embodiment, as illustrated in FIG. 3, the device REFGEN receives the signal EN-S and the voltage VDD. The device REFGEN then comprises circuit 222 configured to receive the signal EN-S, and to pull when the signal EN-S is at its high level, node 206 to that of the potential GND and the voltage VDDE which controls the OFF state of transistor Ten. Thus, in the embodiment shown in FIG. 3 where transistor Ten is P-channel, and has its source connected to node 202, circuit 222 is configured to pull node 206 to node 202 when signal EN-S is at its high level.

When the current value of the voltage VDDE is less than Vmax, and the signal cmd controls the high level of the signal EN-S, providing circuit 222 enables the voltage VrefL to be equal to the voltage of node 204 to which the source of transistor To1 is connected. By way of example, such an operation allows in a low-supply mode where the voltage VDDE is at a low value compared with its nominal value, and less than the voltage Vmax, the voltage VrefL to be at a value enabling operation of the cascode structures 102 of the device IP (FIG. 1).

In the embodiment shown in FIG. 3, circuit 222 comprises buffer circuit BUFFn1 and MOS transistor T6. However, in this example, transistor T6 is P-channel, and has its source connected to node 202, and its gate is not connected to the output of circuit BUFFn1. Circuit 222 then further comprises an N-channel MOS transistor T7 and a voltage divider bridge 300 connected in series between nodes 202 and 204. Bridge 300, preferably a resistive divider bridge, is connected between node 202 and transistor T7. Transistor T7 has its source connected to node 204, its gate connected to the output of circuit BUFFn1, and its drain connected to bridge 300. The gate of transistor T6 is connected to an intermediate node 302 of bridge 300.

In the embodiment of circuit 222 described here, when the voltage VDDE is higher than the voltage Vmax, and the signal EN-S is therefore at its low level, transistor T7 then has a zero gate-source voltage but a drain-source voltage equal to the VDDE and therefore higher than the voltage withstand Vmax of the transistors in the device IP. Transistor T7 is thus selected to be able to withstand the voltage VDDE on its drain. For example, transistor T7 is an extended-drain transistor.

The device REFGEN described in relation to FIG. 3 has the advantage of being implementable with MOS transistors similar to those of the device IP, i.e. MOS transistors with a voltage withstand Vmax, except for transistor T7, which is sized to withstand the voltage VDDE on its drain.

We have described above in relation to FIG. 3 an embodiment in which the device REFGEN is configured to deliver the voltage VrefL, implying that transistor To1 has its source connected to node 204.

In a variant embodiment, the device described in relation to FIG. 3 is configured to generate the voltage VrefH. In this case, transistor To1 is P-channel, and has its source connected to node 202. In such a variant, transistor To1 remains controlled from a voltage on an intermediate node of bridge 208, for example node 216, so as to be ON when transistor Ten is OFF, and to be OFF when transistor Ten is ON. In such a variant, the gate of transistor To1 is, for example, connected to node 216, and transistor T5 and resistive element R4 may be omitted. In such a variant, the voltage VrefH is then delivered on the output of circuit BUFFa1 instead of the voltage VrefL, the voltage VrefH following the voltage VDDE as long as transistor Ten is OFF, and being equal to the voltage on node 214 when transistor Ten is ON. By way of example, when the output 218 of circuit BUFFa1 delivers voltage VrefH, bridge 208 is configured so that the voltage on node 214 is equal to 0.55 times the voltage VDDE when transistor Ten is ON.

Figure 4:
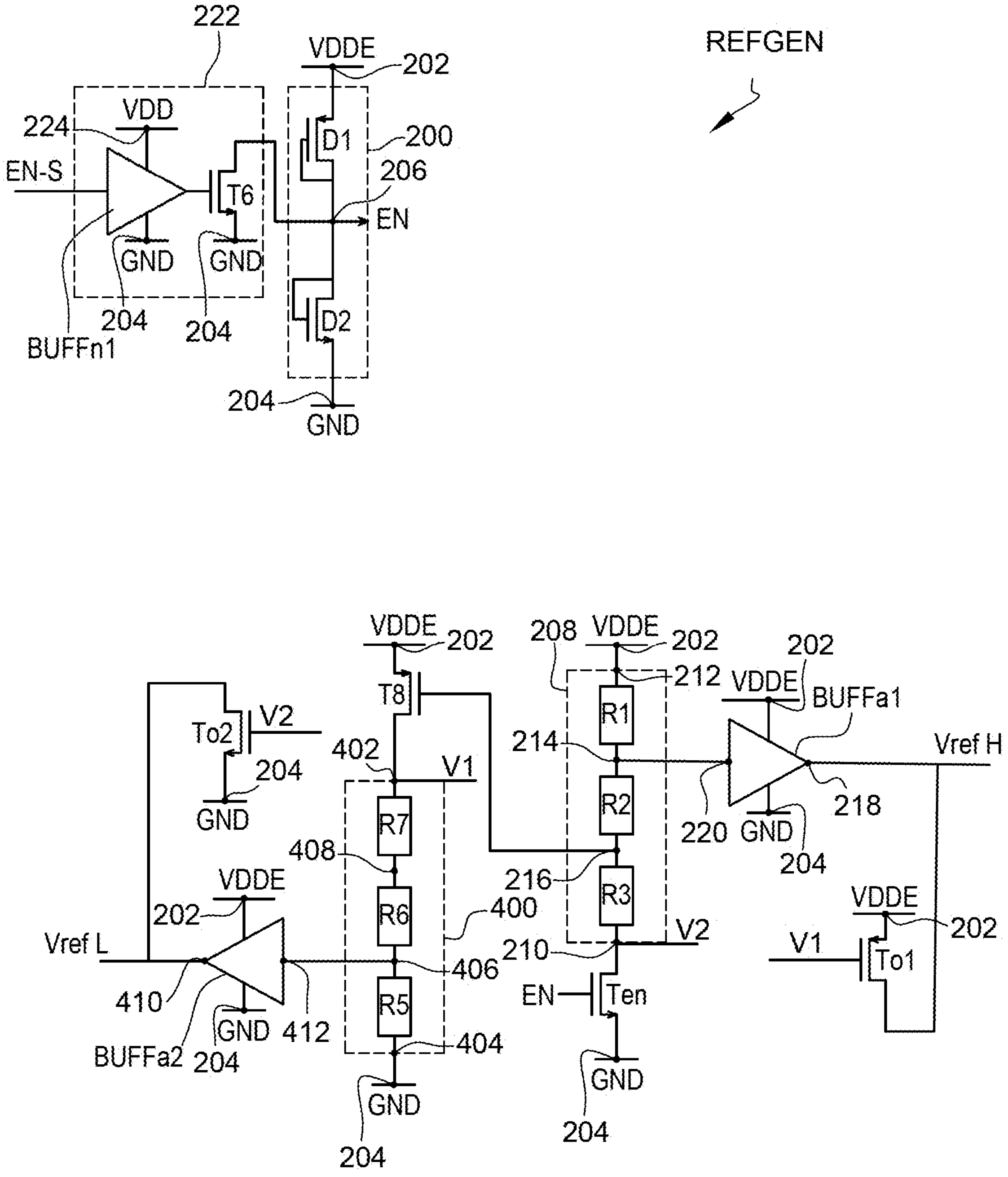
FIG. 4 illustrates, in the form of a circuit, an alternative embodiment of the circuit shown in FIG. 2.

FIG. 4 illustrates, in the form of a circuit, a variant embodiment of the circuit REFGEN shown in FIG. 2. Compared with the circuit REFGEN shown in FIG. 2, which is configured to deliver voltage VrefH, the circuit REFGEN shown in FIG. 4 is configured to generate voltage VrefH and voltage VrefL.

The device REFGEN shown in FIG. 4 has many features in common with the device shown in FIG. 2, and only the differences between these two devices are highlighted here. In particular, unless indicated otherwise, all that has been stated for the device REFGEN described in relation to FIG. 2 applies to the device REFGEN shown in FIG. 4.

Compared with the device REFGEN shown in FIG. 2, the device REFGEN shown in FIG. 4 further comprises a resistive voltage divider bridge 400 and a MOS transistor T8 in series between nodes 202 and 204.

The source of transistor T8 is connected to whichever of nodes 202 and 204 the source of transistor Ten is not connected to, i.e. node 202 in the embodiment shown in FIG. 4. In the embodiment shown in FIG. 4, transistor T8 is P-channel.

Transistor T8 is configured to be ON, respectively OFF, when transistor Ten is ON, respectively OFF. In the embodiment shown in FIG. 4, transistor T8 has its gate connected to an intermediate node of bridge 208, for example node 216.

The dividing bridge 400 has one end 402 connected to the drain of transistor T8. The dividing bridge 400 has another end 404 connected to node 204 in the embodiment shown in FIG. 4.

The bridge 400 comprises, for example, at least three resistive elements R5, R6, and R7. Each resistive element R5, R6, R7 of bridge 400 may correspond to a single resistor or to a series and/or parallel combination of several resistors. By way of example, element R5 is connected between end 404 and an intermediate node 406 of bridge 400, element R6 is connected between node 406 and another intermediate node 408 of bridge 400, and element R7 is connected between node 408 and end 402 of bridge 400.

Compared with the device REFGEN shown in FIG. 2, the device REFGEN shown in FIG. 4 comprises a buffer circuit BUFFa2. Circuit BUFFa2 is supplied with voltage VDDE. For example, circuit BUFFa2 has one terminal connected to node 202, and one terminal connected to node 204.

The circuit BUFFa2 is an analog buffer circuit. In other words, circuit BUFFa2 is configured to deliver a voltage at its output 410 having a value identical to that of a voltage it receives at its input 412, while ensuring isolation between its input and its output. In yet other words, circuit BUFFa2 is a unity-gain follower circuit.

Input 412 of circuit BUFFa2 is connected to an intermediate node of bridge 400, for example node 406. In the embodiment shown in FIG. 4, output 410 of circuit BUFFa2 delivers voltage VrefL.

The device REFGEN further comprises a MOS transistor To2. The drain of transistor To2 is connected to the output of circuit BUFFa2. The source of transistor To2 is connected to node 204 in the embodiment shown in FIG. 4, where circuit BUFFa2 is configured to deliver voltage VrefL. In other words, the source of transistor To2 and the source of transistor To1 are connected to different ones respective nodes 202 and 204. In the embodiment shown in FIG. 4, transistor To2 is N-channel.

Transistor To2 is configured to be in ON state when transistor T8 is in OFF state, and to be in OFF state when transistor T8 is in ON state.

More particularly, in the embodiment shown in FIG. 4, transistor To2 is configured so that its ON or OFF state is determined by a voltage value V2 on a node of the dividing bridge 208, for example on node 210 of the dividing bridge 300, and transistor To1 is configured so that its ON or OFF state is determined by a voltage value V1 on a node of the dividing bridge 400, for example on node 402 of the bridge 400. Transistor To1 has its gate coupled, preferably connected, to node 402, transistor To2 having its gate connected, preferably connected, to node 210.

In an alternative embodiment (not shown), the device REFGEN comprises a MOS transistor and a resistive element in series between nodes 202 and 204, identical to transistor T5 and element R4 shown in FIG. 2, and connected to each other, to bridge 208, and to transistor To1 in the same way as transistor T5 and element R4 shown in FIG. 2. Transistor To1 is therefore not controlled by voltage V1 of bridge 400. Compared with the embodiment shown in FIG. 4, this variant takes up more space.

In another alternative embodiment, which can be combined with the above embodiment, the device REFGEN comprises a MOS transistor and a resistive element in series between nodes 202 and 204, identical to transistor T5 and element R4 shown in FIG. 3, and connected to each other, to bridge 208, and to transistor To1 in the same way as transistor T5 and element R4 shown in FIG. 3. Transistor To2 is then not controlled by voltage V2 of bridge 208. Compared with the embodiment shown in FIG. 4, this variant takes up more space.

In the embodiment shown in FIG. 4, the device REFGEN comprises the circuit 222 shown in FIG. 2.

In an alternative embodiment, circuit 222 is omitted.

The operation of the device REFGEN shown in FIG. 4 is readily understood by those skilled in the art, based on the functional description of the devices REFGEN shown in FIGS. 2 and 3.

The device REFGEN described in relation to FIG. 3 has the advantage of being implementable with MOS transistors similar to those of the device IP, i.e. MOS transistors with a voltage withstand Vmax.

Figure 5:
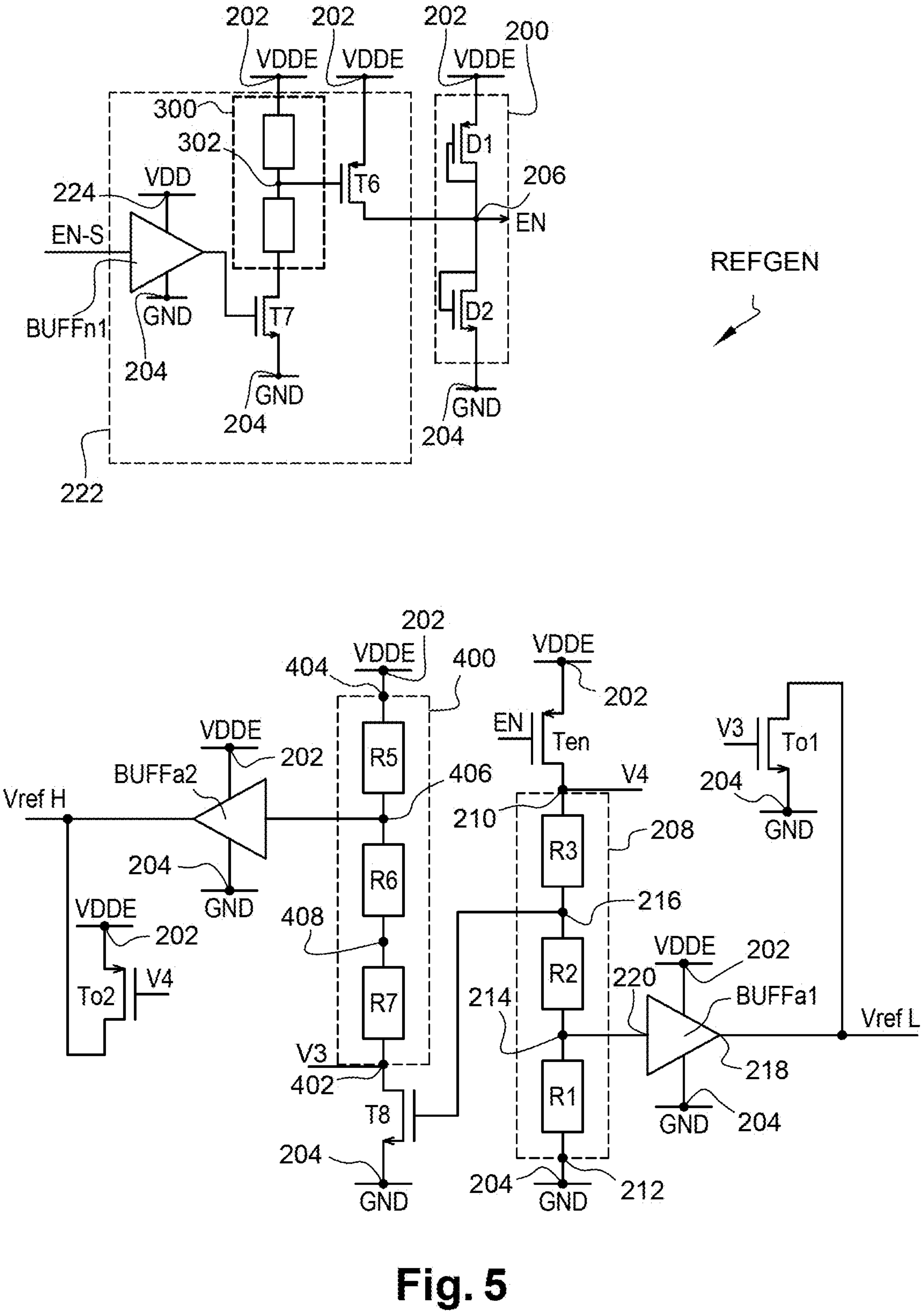
FIG. 5 illustrates, in the form of a circuit, an alternative embodiment of the circuit shown in FIG. 3.

FIG. 5 illustrates, in the form of a circuit, a variant embodiment of the circuit REFGEN shown in FIG. 3. Compared with the circuit REFGEN shown in FIG. 3, which is configured to deliver the voltage VrefL, the circuit REFGEN shown in FIG. 5 is configured to generate the voltage VrefL and the voltage VrefH.

The device REFGEN shown in FIG. 5 has many features in common with the device shown in FIG. 3, and only the differences between these two devices are highlighted here. In particular, unless indicated otherwise, all that has been stated for the device REFGEN described in relation to FIG. 3 applies to the device REFGEN shown in FIG. 5. Further, as the device REFGEN shown in FIG. 5 comprises elements described in relation to the device REFGEN shown in FIG. 4. For these elements, only the differences between FIG. 4 and FIG. 5 are highlighted.

Compared with the device REFGEN shown in FIG. 3, the device REFGEN shown in FIG. 5 further comprises, as the device REFGEN shown in FIG. 4, the resistive voltage divider bridge 400 and a MOS transistor T8 in series between nodes 202 and 204.

The source of transistor T8 is connected to whichever of nodes 202 and 204 the source of transistor Ten is not connected to, i.e. node 204 in the embodiment shown in FIG. 5. In the embodiment shown in FIG. 5, transistor T8 is N-channel.

Transistor T8 is configured to be ON, respectively OFF, when transistor Ten is ON, respectively OFF. In the embodiment shown in FIG. 4, transistor T8 has its gate connected to an intermediate node of bridge 208, for example node 216.

The dividing bridge 400 has its end 404 connected to node 202 in the embodiment shown in FIG. 4.

Compared with the device REFGEN shown in FIG. 3, the device REFGEN shown in FIG. 5 comprises, as the circuit REFGEN shown in FIG. 4, the buffer circuit BUFFa2. The input 412 of the circuit BUFFa2 is connected to an intermediate node of the bridge 400, for example to node 406. In the embodiment shown in FIG. 5, the output 410 of circuit BUFFa2 delivers voltage VrefH.

As the device REFGEN shown in FIG. 4, the device REFGEN shown in FIG. 5 further comprises a MOS transistor To2. The source of transistor To2 is connected to node 202 in the embodiment shown in FIG. 5, where circuit BUFFa2 is configured to deliver voltage VrefH. In other words, the source of transistor To2 and the source of transistor To1 are connected to different respective nodes 202 and 204. In the embodiment shown in FIG. 5, transistor To2 is P-channel.

More particularly, in the embodiment shown in FIG. 5, transistor To2 is configured so that its ON or OFF state is determined by a voltage value V4 on a node of the dividing bridge 208, for example on node 210 of the dividing bridge 300, and transistor To1 is configured so that its ON or OFF state is determined by a voltage value V3 on a node of the dividing bridge 400, for example on node 402 of the bridge 400. Transistor To1 has its gate coupled, preferably connected, to node 402, while transistor To2 has its gate connected, preferably connected, to node 210.

In an alternative embodiment (not shown), the device REFGEN comprises a MOS transistor and a resistive element in series between nodes 202 and 204, identical to transistor T5 and element R4 shown in FIG. 3, and connected to each other, to bridge 208, and to transistor To1 in the same way as transistor T5 and element R4 shown in FIG. 3. Transistor To1 is therefore not controlled by the voltage V3 of bridge 400. Compared with the embodiment shown in FIG. 5, this variant takes up more space.

In another alternative embodiment, which can be combined with the above alternative embodiment, the device REFGEN comprises a MOS transistor and a resistive element in series between nodes 202 and 204, identical to transistor T5 and element R4 shown in FIG. 2, and connected to each other, to bridge 208, and to transistor To1 in the same way as transistor T5 and element R4 shown in FIG. 2. Transistor To2 is then not controlled by the voltage V4 of bridge 208. Compared with the embodiment shown in FIG. 4, this variant takes up more space.

In the embodiment shown in FIG. 5, the device REFGEN comprises the circuit 222 shown in FIG. 3.

In an alternative embodiment, circuit 222 is omitted.

The operation of the device REFGEN shown in FIG. 5 can be understood by those skilled in the art, based on the functional description of the devices REFGEN shown in FIGS. 2 and 3.

The device REFGEN described in relation to FIG. 3 has the advantage of being implementable with MOS transistors similar to those of the device IP, i.e. MOS transistors with a voltage withstand Vmax, except for transistor T7, which is sized to withstand the voltage VDDE on its drain.

Figure 6:
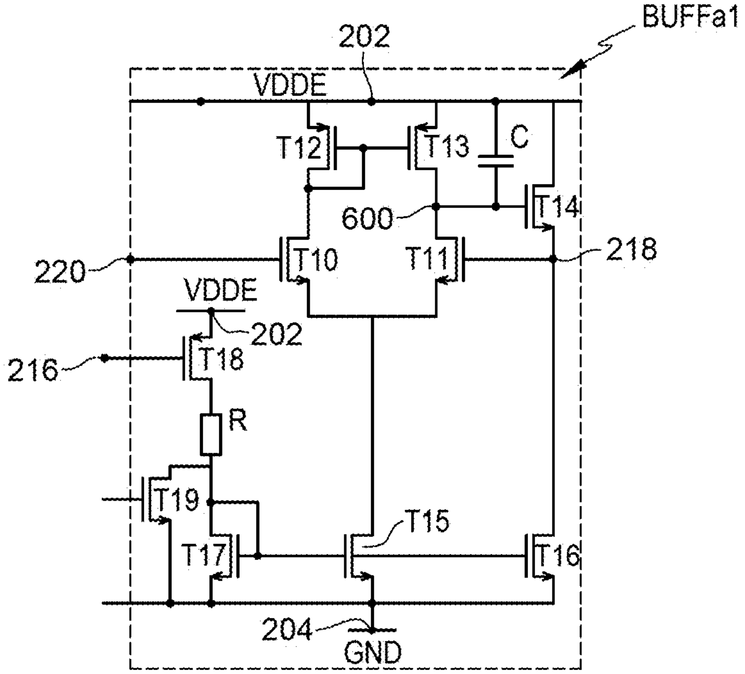
FIG. 6 illustrates, in the form of a circuit, an example embodiment of an analog buffer circuit.

FIG. 6 illustrates, in the form of a circuit, an example embodiment of an analog buffer circuit configured to deliver the voltage VrefH. In this example, the buffer circuit described is the circuit BUFFa1 implemented in the circuit REFGEN shown in FIG. 4.

The circuit BUFFa1 comprises a differential pair comprising two MOS transistors T10 and T11. As the circuit BUFFa1 delivers the voltage VrefH, transistors T10 and T11 are preferably N-channel.

Transistor T10 has its gate connected to input 220 of the circuit BUFFa1, and therefore receives, in this example, the voltage present at node 214 of bridge 208 (FIG. 4). Transistor T11 has its gate connected to the output 218 of the circuit BUFFa1, and therefore receives the voltage VrefH.

The circuit BUFFa1 further comprises two MOS transistors T12 and T13 current-mirroring each other, and configured to bias the respective transistors T10 and T11 of the differential pair. As the circuit BUFFa1 delivers the voltage VrefH, transistors T12 and T13 are preferably P-channel. For example, transistors T12 and T13 have their sources connected to node 202, and their gates connected to each other, with the gate of transistor T12 further connected to the drain of this transistor T12. For example, the drain of transistor T12, respectively T13, is connected to the drain of transistor T10, respectively T11.

The circuit BUFFa1 further comprises a MOS transistor T14 having its gate connected to a node 600 connecting transistor T13 to transistor T11, and its source connected to the circuit output 218. As the circuit BUFFa1 delivers the voltage VrefH, transistor T14 is preferably N-channel, and has its drain connected to node 202.

Preferably, a capacitive element C is connected between the gate and source of transistor T14 to improve the stability of the circuit BUFFa1.

The BUFFa1 circuit further comprises a MOS transistor T15 coupling the differential pair (transistors T10 and T11) to the one of nodes 202 and 204 the transistors T12 and T13 are not connected to, and a MOS transistor T16 coupling the output 218 to the one of nodes 202 and 204 the transistor T14 is not connected to. In the example shown in FIG. 6, as transistors T12 and T13 are connected to node 202, transistor T15 therefore couples the differential pair to node 204, and, furthermore, as transistor T14 is connected to node 202, transistor T16 therefore couples output 218 to node 204. In this example, transistors T15 and T16 are therefore N-channel. For example, transistors T15 and T16 have their sources connected to node 204, transistor T15 has its drain coupled, preferably connected, to the sources of transistors T10 and T11 of the differential pair, and transistor T16 has its drain coupled, preferably connected, to output 218.

The circuit BUFFa1 further comprises a MOS transistor T17 having a channel of the same type as the channels of transistors T15 and T16, i.e. N-channel in this example. This transistor T17 has its source connected to the same node, 204 in this example, as the node the sources of transistors T15 and T16 are connected to. Transistors T15 and T16 are current mirrored with transistor T17. For example, the gates of transistors T15 and T16 are each connected to the gate of transistor T17, with the gate of transistor T17 further connected to the drain of transistor T17.

According to one embodiment, transistor T17 is advantageously biased from an intermediate node of the resistive divider bridge the circuit BUFFa1 is connected to, i.e. from an intermediate node of bridge 208 in this example, e.g. from node 216 of bridge 208 (FIG. 4).

For example, the circuit BUFFa1 comprises a MOS transistor T18 having a channel of the opposite type to that of the channel of transistor T17, and having its source connected to whichever of nodes 202 and 204 the transistor T17 is not connected to. Thus, in this example, transistor T18 is P-channel, and has its source connected to node 202. In addition, the gate of transistor T18 is connected to the intermediate node 216 of bridge 208, from which transistor T17 is biased. A resistor R couples the drains of transistors T17 and T18 together.

In one alternative embodiment, transistor T17 can be biased other than from a node of the resistive divider bridge the input 220 of circuit BUFFa1 is connected to.

According to one embodiment, to limit the power consumption of the circuit BUFFa1 when transistor Ten is in the OFF state (FIG. 4), the circuit BUFFa1 comprises a MOS transistor T19 having a channel of the same type as that of transistor T17, i.e. N-channel in this example. Transistor T19 is configured to bypass transistor T17 when transistor Ten (FIG. 4) is turned OFF. For example, transistor T19 has its source, respectively its drain, connected to the source, respectively the drain, of transistor T17. By way of example, so that transistor T19 is ON when transistor Ten is OFF, the gate of transistor T19 is coupled, preferably connected, to the drain of the transistor which is in series with the resistive divider bridge the input 220 of circuit BUFFa1 is connected to, i.e. to the drain of transistor Ten in this example.

Although an example of the circuit BUFFa1 of the device REFGEN shown in FIG. 4 has been described above, the circuit BUFFa2 shown in FIG. 5 can be implemented by the circuit described in relation to FIG. 6. By way of example, in this case, the gate of transistor T10 is connected to the node 406 of bridge 400, the gate of transistor T18 is connected to a node of bridge 400, for example node 408, and the gate of transistor T19 is connected to the drain of transistor T8.

Figure 7:
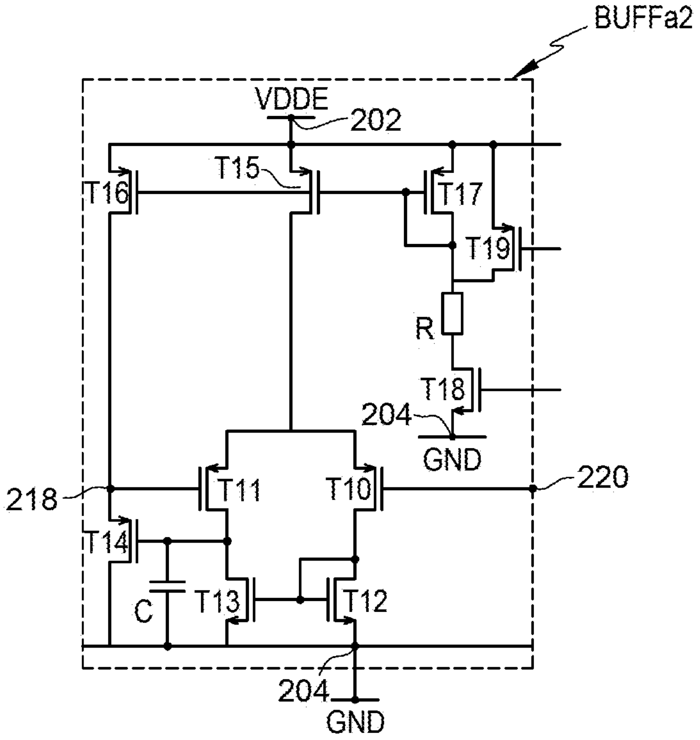
FIG. 7 illustrates, in the form of a circuit, another example embodiment of an analog buffer circuit.

FIG. 7 illustrates, in the form of a circuit, an example embodiment of an analog buffer circuit configured to deliver the voltage VrefL. In this example, the buffer circuit described is the circuit BUFFa2 implemented in the circuit REFGEN shown in FIG. 4.

The circuit BUFFa2 shown in FIG. 7 is similar to the circuit BUFFa1 shown in FIG. 6, and has many elements in common with the latter, with only the differences between these two devices being highlighted here.

In particular, as the circuit BUFFa2 delivers the voltage VrefL, transistors T10 and T11 of the circuit BUFFa2 are preferably P-channel.

Transistor T10 here has its gate connected to the input 220 of the circuit BUFFa2, and therefore receives, in this example, the voltage present at node 406 of bridge 400 (FIG. 4). Further, transistor T11 here has its gate connected to the output 218 of the circuit BUFFa2, and therefore receives the voltage VrefL.

As the circuit BUFFa2 delivers the voltage VrefL, the transistors T12 and T13 current-mirroring each other to bias the respective transistors T10 and T11 of the differential pair are preferably N-channel. For example, transistors T12 and T13 here have their sources connected to node 204, and their gates connected to each other, with the gate of transistor T12 further connected to the drain of this transistor T12. For example, the drain of transistor T12, respectively T13, is connected to the drain of transistor T10, respectively T11.

As the circuit BUFFa2 delivers the voltage VrefL, transistor T14 having its gate connected to node 600, and its source connected to output 218 of the circuit BUFFa2, is preferably P-channel, and has its drain connected to node 202.

Preferably, circuit BUFFa2 comprises capacitive element C connected between the gate and source of transistor T14 to improve its stability.

In this embodiment, as transistors T12 and T13 are connected to node 204, transistors T15 and T16 are connected to node 202. Transistor T15 therefore couples the differential pair to node 202, and transistor T16 thus further couples output 218 to node 202. In this example, transistors T15 and T16 are therefore P-channel. For example, transistors T15 and T16 have their sources connected to node 202, transistor T15 has its drain coupled, preferably connected, to the sources of transistors T10 and T11, and transistor T16 has its drain coupled, preferably connected, to output 218.

Transistor T17 having a channel of the same type as the channels of transistors T15 and T16, is therefore P-channel in the circuit BUFFa2, and has its source connected to the same node, 202 in this example, as the node the sources of transistors T15 and T16 are connected to. Transistors T15 and T16 are current mirrored with transistor T17.

According to one embodiment, transistor T17 is advantageously biased from an intermediate node of the resistive divider bridge the circuit BUFFa2 is connected to, i.e. from an intermediate node of bridge 400 in this example, for example from node 406 of bridge 400 (FIG. 4).

For example, circuit BUFFa2 comprises MOS transistor T18 having a channel of the opposite type to that of the channel of transistor T17, and having its source connected to whichever of nodes 202 and 204 the transistor T17 is not connected to. Thus, in this example, transistor T18 is N-channel, and has its source connected to node 204. In addition, the gate of transistor T18 is connected to intermediate node 406 of bridge 400, from which transistor T17 is biased. Resistor R couples the drains of transistors T17 and T18 together.

In one alternative embodiment, transistor T17 can be biased other than from a node of the resistive divider bridge the input 220 of circuit BUFFa2 is connected to.

According to one embodiment, to limit the power consumption of the circuit BUFFa2 when transistor Ten is in the OFF state (FIG. 4), the circuit BUFFa2 comprises a MOS transistor T19 with a channel of the same type as that of transistor T17, i.e. P-channel in this example. Transistor T19 is configured to bypass transistor T17 when transistor Ten (FIG. 4) is turned OFF. For example, transistor T19 has its source, respectively its drain, connected to the source, respectively the drain, of transistor T17. By way of example, so that transistor T19 is ON when transistor Ten is OFF, the gate of transistor T19 is coupled, preferably connected, to the drain of the transistor which is in series with the resistive divider bridge the input 220 of circuit BUFFa2 is connected to, i.e. to the drain of transistor T8 in this example.

Although an example of the circuit BUFFa2 of the device REFGEN shown in FIG. 4 has been described above, the circuit BUFFa1 shown in FIG. 5 can be implemented by the circuit described in relation to FIG. 7. By way of example, in this case, the gate of transistor T10 of the circuit shown in FIG. 7 is connected to node 214 of bridge 208, the gate of transistor T18 is connected to a node of bridge 208, for example node 216, and the gate of transistor T19 is connected to the drain of transistor Ten.

In the embodiments and variants described above in relation to FIGS. 1 to 7, each of the voltages VrefH and VrefL is generated from the voltage VDDE. Thus, each of the voltages VrefH and VrefL follows the variations of the voltage VDDE, and, in particular, the overvoltages or undervoltages of the voltage VDDE. This allows the voltages across cascode transistors T2 and T3 of structures 100 and 102 to be kept at values less than the voltage withstand limit Vmax of these transistors. Further, as each of the voltages VrefH and VrefL follows the variations in the voltage VDDE, and is not generated from the voltage VDD, there is no longer any constraint on the order in which the supply voltages VDDE and VDD must be supplied.

In the embodiments and variants described above in relation to FIGS. 1 to 7, when transistor Ten is ON, each of the voltages VrefH and VrefL is generated from the voltage VDDE by a corresponding resistive voltage divider bridge 208 or 400. The temperature dependence of the current value of each of the voltages VrefL and VrefH is thus reduced or eliminated. Further, the ratio between the current value of the voltage VrefH, respectively VrefL, and that of the voltage VDDE can be easily selected by adapting the values of one or more of the resistive elements of the corresponding bridge 208 or 400.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

What is claimed is:

1. A device for generating a reference voltage comprising:
a first voltage divider bridge connected between a first supply node configured to receive a first supply voltage, and a second supply node configured to receive a reference potential;
a first MOS transistor and a second resistive voltage divider bridge connected in series between the first and second supply nodes, the first transistor having its gate connected to an intermediate node of the first bridge, and its source connected to one of the first and second supply nodes;
a first buffer circuit configured to be supplied with the first voltage, and comprising an input connected to a first intermediate node of the second bridge, and an output configured to deliver a first reference voltage; and
a second MOS transistor having its drain connected to the output of the first buffer circuit, and its source connected to one of the first and second supply nodes,
wherein the first bridge is configured so that the first transistor (Ten) is OFF when the first voltage is at a value less than a first threshold itself less than a voltage withstand limit of the transistors, and
wherein the second transistor is configured to be ON if the first transistor is OFF, and vice versa.

2. The device according to claim 1, wherein:
the first transistor is N-channel, and has its source connected to the second supply node;
the device further comprises a third MOS transistor in series with a first resistive element between the first and second supply nodes, the third transistor being P-channel, and having its source connected to the first supply node, and its gate connected to a second intermediate node of the second bridge; and
the second transistor is P-channel, and has its gate connected to the drain of the third transistor.

3. The device according to claim 2, wherein the device further comprises:
a second buffer circuit configured to be supplied with a second supply voltage having a nominal value lower than that of the first supply voltage; and
an N-channel MOS transistor having its source connected to the second supply node, its drain connected to the intermediate node of the first bridge, and its gate connected to the output of the second buffer circuit,
wherein the second buffer circuit is intended to receive a binary signal at a low level corresponding to a zero voltage if a current value of the first voltage is higher than the voltage withstand limit of the transistors, and at a low or high level determined by a control otherwise, the high level of said signal corresponding to the second supply voltage.

4. The device according to claim 1, wherein:

the first transistor is P-channel, and has its source connected to the first supply node;

the device further comprises a third MOS transistor in series with a first resistive element between the first and second supply nodes, the third transistor being N-channel, and having its source connected to the second supply node, and its gate connected to a second intermediate node of the second bridge; and the second transistor is N-channel, and has its gate connected to the drain of the third transistor.

5. The device according to claim 4, wherein the device further comprises:

a second buffer circuit configured to be supplied with a second supply voltage having a nominal value lower than that of the first supply voltage;

a third voltage divider bridge and an N-channel MOS transistor connected in series between the first and second supply nodes, the transistor having its source connected to the second supply node, its drain connected to the third bridge, and its gate connected to the output of the second buffer circuit; and a P-channel MOS transistor having its source connected to the first supply node, its gate connected to the intermediate node of the third bridge, and its drain connected to the intermediate node of the first bridge, wherein the second buffer circuit is intended to receive a binary signal at a low level corresponding to zero voltage if a current value of the first voltage is higher than the voltage withstand limit of the transistors, and at a low or high level determined by a control otherwise, the high level of said signal corresponding to the second supply voltage.

6. The device according to claim 1, wherein the device further comprises:

a third MOS transistor and a third resistive voltage divider bridge connected in series between the first and second supply nodes, the sources of the first and third transistors being connected to respective different ones of the first and second supply nodes;

a second buffer circuit configured to be supplied with the first voltage, and comprising an input connected to a first intermediate node of the third bridge, and an output configured to deliver a second reference voltage; and a fourth MOS transistor having its drain connected to the output of the second buffer circuit, the sources of the second and fourth transistors being connected to respective different ones of the first and second supply nodes;

wherein the third transistor is configured to be in the OFF state, respectively ON, when the first transistor is in the OFF state, respectively ON, and wherein the fourth transistor is configured to be ON if the third transistor is OFF, and vice versa.

7. The device according to claim 6, wherein:

the first transistor is N-channel, and has its source connected to the second supply node;

the third transistor is P-channel, and has its gate connected to a second intermediate node of the second bridge;

the second transistor is P-channel, and has its gate coupled, preferably connected, to the drain of the third transistor, and its source connected to the first supply node; and the fourth transistor is N-channel, and has its gate coupled, preferably connected, to the drain of the first transistor.

8. The device according to claim 7, wherein the device further comprises: a third buffer circuit configured to be supplied with a second supply voltage having a nominal value lower than that of the first supply voltage; and an N-channel MOS transistor having its source connected to the second supply node, its drain connected to the intermediate node of the first bridge, and its gate connected to the output of the third buffer circuit, wherein the third buffer circuit is intended to receive a binary signal at a low level corresponding to zero voltage if a current value of the first voltage is higher than the voltage withstand limit of the transistors, and at a low or high level determined by a control otherwise, the high level of said signal corresponding to the second supply voltage.

9. The device according to claim 6, wherein:

the first transistor is P-channel, and has its source connected to the first supply node;

the third transistor is N-channel, and has its gate connected to a second intermediate node of the second bridge;

the second transistor is N-channel, and has its gate coupled, preferably connected, to the drain of the third transistor, and its source connected to the second supply node; and the fourth transistor is P-channel, and has its gate coupled, preferably connected, to the drain of the first transistor.

10. The device according to claim 9, wherein the device further comprises:

a third buffer circuit configured to be supplied with a second supply voltage having a nominal value lower than that of the first supply voltage;

a fourth voltage divider bridge, and an N-channel MOS transistor connected in series between the first and second supply nodes, the transistor having its source connected to the second supply node, its drain connected to the fourth bridge, and its gate connected to the output of the third buffer circuit; and a P-channel MOS transistor having its source connected to the first supply node, its gate connected to the intermediate node of the fourth bridge, and its drain connected to the intermediate node of the first bridge, wherein the third buffer circuit is configured to receive a binary signal at a low level corresponding to zero voltage if a current value of the first voltage is higher than the voltage withstand limit of the transistors, and at a low or high level determined by a command otherwise, the high level of said signal corresponding to the second supply voltage.

11. A system comprising the device according to claim 3, and a circuit configured to receive said command, first voltage and second voltage, and to deliver said binary signal.

12. A system comprising the device according to claim 5, and a circuit configured to receive said command, first voltage and second voltage, and to deliver said binary signal.

13. A system comprising the device according to claim 8, and a circuit configured to receive said command, first voltage and second voltage, and to deliver said binary signal.

14. A system comprising the device according to claim 10, and a circuit configured to receive said command, first voltage and second voltage, and to deliver said binary signal.

* * * * *